United States Patent [19]

Thielen et al.

[11] 4,150,719

[45] Apr. 24, 1979

[54] PROCESS AND APPARATUS FOR CONTROLLED AND GENTLE HEATING OR COOLING OF VISCOUS SOLUTIONS OR MELTS OF THERMOPLASTICS

[75] Inventors: Gunter Thielen, Ludwigshafen; Johann Zizlsperger, Schriesheim; Rudi W. Reffert, Beindersheim; Hans Wild, Frankenthal; Peter Fink, Speyer, all of Fed. Rep. of Germany

[73] Assignee: BASF Aktiengesellschaft, Fed. Rep. of Germany

[21] Appl. No.: 746,885

[22] Filed: Dec. 2, 1976

[30] Foreign Application Priority Data

Dec. 6, 1975 [DE] Fed. Rep. of Germany ....... 2555079

[51] Int. Cl.$^2$ ............................................... F28F 3/08
[52] U.S. Cl. ..................................... 165/140; 165/166
[58] Field of Search ................ 165/166, 140, 145, 165

[56] References Cited

U.S. PATENT DOCUMENTS

| | | | |
|---|---|---|---|
| 1,662,870 | 3/1928 | Stancliffe | 165/166 |
| 2,040,947 | 5/1936 | Mojonnier et al. | 165/140 X |
| 2,513,898 | 7/1950 | Switzer et al. | 165/140 X |
| 2,539,870 | 1/1951 | Simpelaar | 165/166 |

*Primary Examiner*—Albert W. Davis, Jr.
*Attorney, Agent, or Firm*—Keil & Witherspoon

[57] ABSTRACT

A process and an apparatus for heating or cooling very viscous solutions or melts of thermoplastics in the form of thin layers. The plastic solution or melt is spread under the temperature conditions of the feed solution or melt, and the thin layers are heated stepwise so that the temperature difference between the heat transfer medium and the solution or melt is at all times less than 50° C. and preferably less than 20° C. Viscous solutions or melts of thermoplastics can be heated or cooled rapidly and uniformly under gentle and controlled conditions, to prepare the solutions or melts for further treatment in conventional equipment.

4 Claims, 9 Drawing Figures

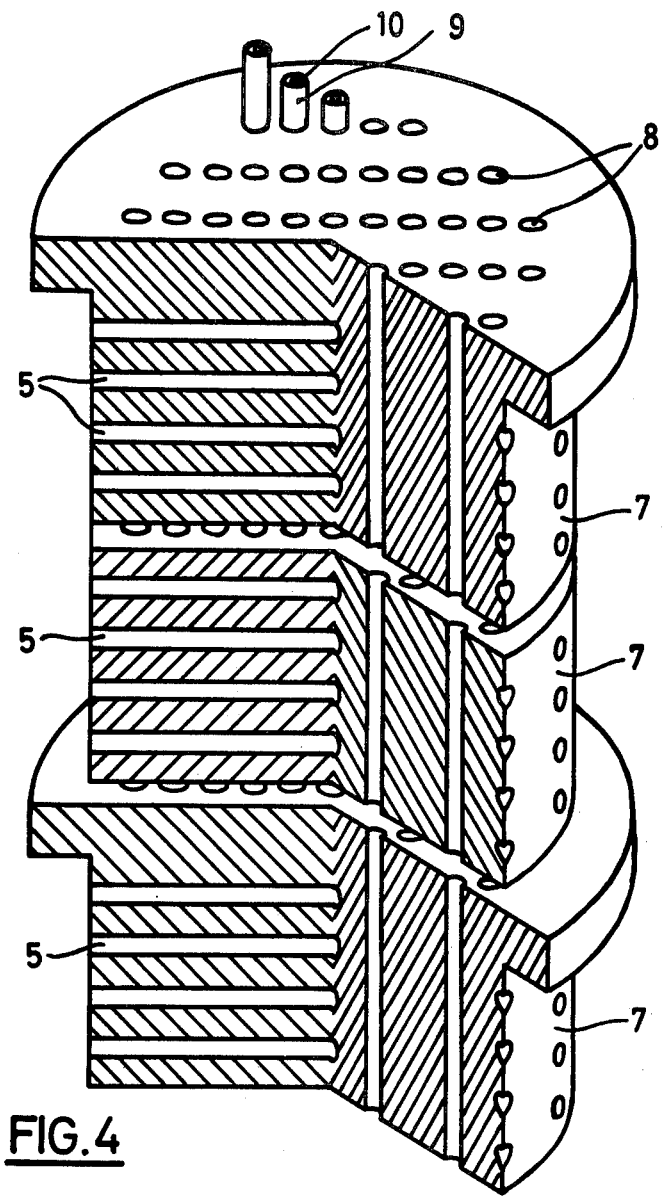
FIG. 4
FIG. 5
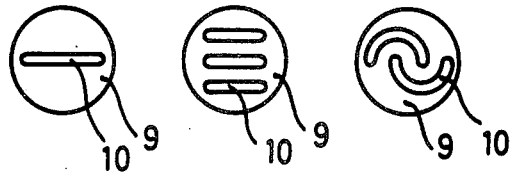

PROCESS AND APPARATUS FOR CONTROLLED AND GENTLE HEATING OR COOLING OF VISCOUS SOLUTIONS OR MELTS OF THERMOPLASTICS

The present invention relates to a process for heating or cooling high-viscosity solutions or melts of thermoplastics under controlled and gentle conditions, in which process the solution or melt passes, in thin layers, through a heat exchange zone. The invention further relates to apparatus for carrying out such a process.

As a preparation for numerous methods of processing and after-treating thermoplastics, it is necessary to bring high-viscosity polymer solutions or melts, by a defined thermal pre-treatment, to a condition which enables the products to be further treated or after-treated by conventional methods. Numerous processes and diverse apparatus have already been proposed for this purpose and are suitable, to a greater or lesser degree, for the large variety of thermoplastics which have different properties. For example, extruders can be used to heat or cool polymer solutions or melts. It is true that extruders are very suitable for heating the products, but are rather unsuitable for cooling them and hence for controlled and economic conditioning.

Tubular heat exchangers or plate heat exchangers have also been disclosed. Conventional apparatus of this kind has the disadvantage that the thermoplastic is heated or cooled in the form of relatively thick layers. Because of the great temperature differences between the product and the heat transfer medium which this entails, the layers of product which are in contact with the walls become superheated or supercooled, which results in thermal degradation and/or non-uniform flow and, as a result of the latter, an undesirable residence time distribution in the heat exchanger. In the case of heat-sensitive thermoplastics, e.g. copolymers of styrene with acrylonitrile or methacrylonitrile, this is known to lead to discoloration, and after only a short time black coke-like decomposition products are formed, which progressively contaminate the polymer and as a result greatly detract from its usefulness. If the solutions or melts of the thermoplastics to be heated or cooled contain elasticizing components, e.g. graft rubbers, undefined conditioning may cause degradation processes or subsequent crosslinking, which may have an undesirable effect on the properties of the product.

U.S. Pat. No. 3,014,702 discloses an apparatus which permits heating or cooling high-viscosity fluids, e.g. polymer melts, in thin layers. It is true that this provides rapid heat transfer but in this case again the temperature control in the apparatus does not permit adequately controlled and gentle heating or cooling. Furthermore, as a result of the way in which the stream of product flows in the apparatus, the viscous fluid cannot immediately run off the heated surfaces without unnecessarily long heat exposure. As a result, when using such an apparatus, damage to the product, in the case of heat-sensitive polymer solutions or melts, can again not be excluded. The black, coke-like decomposition products not only cause contamination of the product but also result in objectionable deposits in the gaps of the heat exchanger through which the product passes, and such deposits must be removed at regular intervals. Associated with this, a further disadvantage of the said apparatus is that the gaps through which the product passes are not easily accessible and cannot be cleaned rapidly and simply.

It is an object of the present invention to provide a process and apparatus for heating or cooling high-viscosity solutions or melts of thermoplastics under controlled and gentle conditions, which process and apparatus suffer very much less, if at all, from the above disadvantages. It is a more specific object of the invention to provide a method of heating or cooling heat-sensitive polymers in a simple manner with minimum expenditure of energy and capital investment, without causing significant damage to the product.

We have found that this object is achieved by the process according to the invention for the controlled and gentle heating or cooling of high-viscosity solutions or melts of thermoplastics, the solution or melt flowing, as a thin layer, through a heat exchange zone, in which process the said solution or melt is spread as a thin layer under the temperature conditions of the feed solution or melt and the heating of the thin layers in the heat exchange zone is effected stepwise in such a way that the temperature difference between the heat transfer medium of the heat exchange zone and the solution or melt is less than 50° C., preferably less than 20° C., at all points in the heat exchange zone, the heat transfer being effected by solid metal blocks built up of segments into which blocks the zones through which the product passes are set in an accessible manner.

It is an essential feature of the invention that the heat exchange zone is sub-divided into such segments that the zones through which the product passes are readily accessible, i.e. can either be exposed or be easily replaced, so that, when required, they can be cleaned or renewed without undue effort.

The process of the invention permits uniform and rapid heating or cooling of the high-viscosity solutions or melts, with precise temperature control. As conditioning is carried out in stages, the product, flowing in the form of thin layers, can be subjected to a gentle heat treatment by selecting low temperature differences in each step. The process is simple to carry out, flexible and of broad applicability.

For the purposes of the present invention, thermoplastics are to be understood as being all macromolecular materials or mixtures of such materials which become plastic and flowable under the action of pressure and heat. The term macromolecular material embraces all polymers obtained essentially by homopolymerization or copolymerization of the monomers in bulk, solution or dispersion, as well as polycondensates and polyaddition products. The mean molecular weight of the thermoplastics, determined as the number average from measurements of the osmotic pressure, is as a rule greater than 500, preferably from 30,000 to 200,000.

In particular, the process of the invention may be used for conditioning heat-sensitive polymers or polymer mixtures. Examples of these are the homopolymers of butadiene, isoprene, isobutylene and vinyl ethers or the copolymers and terpolymers of these monomers with acrylic esters, methacrylic esters and alkylene-aromatic monomers, e.g. styrene or α-methylstyrene. They also include the polymers and polymer mixtures obtained by polymerizing monomer mixtures containing acrylonitrile or methacrylonitrile, e.g. styrene-acrylonitrile copolymers or butadiene-acrylonitrile copolymers. Further examples are the two-phase polymer mixtures in which the disperse phase consists of elasticizing, in most cases grafted, homopolymers, copolymers or terpolymers, e.g. of butadiene, isoprene, acrylic esters and/or vinyl ethers, whilst the continuous phase consists of homopolymers, copolymers or terpolymers of olefinically unsaturated monomers, e.g. styrene, α-methylstyrene, acrylonitrile, methacrylonitrile, acrylic or methacrylic esters (especially with alcohols of 1 to 8 carbon atoms), maleic anhydride and the like. The two-phase polymer mixtures are also referred to as SB, ABS and ASA polymers.

The thermoplastics are manufactured in accordance with the conventional processes, e.g. in bulk, solution or aqueous dispersion and can be heated or cooled under gentle conditions, in accordance with the invention, prior to their further treatment or after-treatment. The solution or melt in general has a viscosity of from $10^2$ to $10^6$ and especially of from $10^3$ to $10^5$ poise, these figures relating to the temperature conditions and process conditions of the feed solution or melt.

For the process of conditioning of the invention, the solution or melt of the thermoplastic is divided into thin layers. It is essential that this division of the stream of product into thin layers should take place under the temperature conditions of the feed solution or melt. For this purpose it is necessary that the temperature of the solution or melt should, in the first conditioning stage of the heat exchange zone, be kept virtually at the temperature of the feed solution or melt. This ensures that the heat transfer during the entire conditioning process takes place uniformly and rapidly in thin layers of the product. An "internal" distribution chamber, as employed in conventional processes, in which the high-viscosity solution or melt in the heat exchange zone is divided into a plurality of small streams of product when it is already under the actual heating conditions is, in contrast, difficult to control in respect of temperature, so that relatively large temperature differences may be set up and above all the product cannot be heated in a controlled manner.

The thin layers of the high-viscosity solution or melt flow through the heat exchange zones in product-flow zones. These product-flow zones are, for example, in the form of flat channels and are set into metal blocks built up of segments and assembled on the unit construction principle, the blocks serving as the heat transfer medium. The metal blocks can be heated by any desired primary heat carrier. For this purpose, all conventional heating and cooling systems, e.g. steam circulation or thermal fluid circulation, electrical heating rods or coolants, can be used. The heat transfer through the metal blocks permits optimum control because of the good heat conduction of the blocks.

To achieve very gentle heating or cooling of the viscous solution or melt, the heat transfer is effected stepwise in a plurality of zones arranged in series in the direction of product flow. The heat exchange zone is sub-divided into at least two, advantageously three or more, preferably independent zones. The temperature of the metal blocks used for heat transfer in the individual zones is regulated, by means of the primary heat carrier, so that the temperature difference between the heat transfer medium and the thin layers of the highly viscous solution or melt is less than 50° C. at any point of the heat exchange zone. Preferably, temperature differences of less than 20° C. are maintained. In the first zone, the temperature of the metal blocks should virtually correspond to the temperature of the feed of viscous solution or melt.

Advantageously, the thickness of the thin layers of product undergoing heating or cooling is from 0.5 to 4 mm, preferably from 0.5 to 3 mm. In this way rapid and uniform heating or cooling over the entire cross-section of the product stream, and hence exact temperature control with small temperature differences, becomes possible even with thermoplastics, though these are as a rule poor heat conductors. As a result of the uniform heating or cooling over the entire cross-section of the layers of product, uniform flow of the viscous solution or melt is achieved and an undesirable residence time distribution in the individual layers of product is avoided.

The width of the cross-section of the thin layers of product, which is equivalent to saying the width of the cross-section of the zones through which the product passes in the heat exchange zone, can be varied within the wide limits, as can the shape of the cross-section, and can as a result be suited to the particular objects of the process. Thus it is possible for the cross-section of the zones through which the product passes in the heat exchange zone to narrow, widen or remain constant in the direction of product flow. The changes can be gradual or abrupt and can extend over the whole, or only over a part, of the zones through which the product passes. The width of the cross-section of such a zone can also undergo several changes, for example it can first narrow and then widen. All that matter is that the thickness of the thin layers of product in the zones through which the product passes, in the heat exchange zone, should always be less then 4 mm.

By changing the width of the cross-section and hence the cross-sectional area of the zones through which the product passes, the flow rate and hence the residence time of the solution or melt can be altered and can, for example, be regulated in different ways in the different zones. Furthermore, the pressure in the zones, through which the product passes, of the heat exchanger can thereby be regulated. When heating or cooling the viscous solutions or melts, the pressure in such zones is, at the highest temperature occurring in the heat exchange zone, in general above the saturation pressure of the volatile constituents of the solution or melt, so as to prevent vaporization and possible foaming.

Furthermore, the thin layers of product are passed through the heat exchange zone in such a way as to avoid unnecessary heat exposure and to ensure that the product leaves the heat exchange zone immediately after having been heated or cooled.

The process according to the invention is illustrated below in terms of a suitable apparatus, which also forms part of the present invention.

This heat exchange apparatus is built up of at least two, preferably three or more, solid metal blocks which are assembled on the unit construction principle, and which can be dismantled into at least 2, and preferably 3 or more, segments. The blocks are pervaded by parallel, preferably vertical, slit-shaped channels through which the solution or melt passes. Furthermore, cavity-like passages, for receiving the primary heat carrier, are provided, also parallel to one another, in the blocks, at right angles to the channels. The cavity-like passages of the total apparatus should be sub-divisable into at least 2, preferably at least 3, groups at right angles to the direction of the channels. A further essential characteristic is that it should be possible to dismantle the apparatus into segments in such a way that the channels through which the product passes become exposed or replaceable, whilst in the assembled condition these segments are coupled in such a way that their joins present no barrier to heat flow.

As a result of being built up of such segments, the apparatus can at any time be opened up along the slit-shaped channels through which the product passes, and the said channels can be cleaned or replaced before reassembly. This is particularly important when conditioning heat-sensitive thermoplastics, which readily tend to decompose, forming coke-like deposits. Depending on the particular object to be achieved by the process and on the particular process conditions, the surfaces of the channels can also be appropriately after-treated and finished. In those embodiments of the apparatus in which it can be dismantled into segments in such a way that the channels through which the product passes are exposed, the said channels can be lined with hollow profiles of a resistant material or readily cleanable material, but the join between the said profiles and channels must not present any barrier to heat flow. The use of replaceable hollow profiles, e.g. in the form of throwaway metal sheets, for lining the channels through which the product passes is advantageous particularly if the decomposition products and deposits resulting from heat-sensitive plastics are difficult to remove by mechanical means or if the solutions or melts to be heated or cooled contain aggressive materials.

The slit-shaped channels, through which the product passes, of the heat exchange apparatus are so designed that the depth of their cross-section, i.e. the direction of minimum dimension of the cross-sectional area, is preferably from 0.5 to 4 mm and especially from 0.5 to 3 mm over the entire length of the channels. Furthermore, the width and shape of cross-section of the channels can be varied extensively and at will, and may or may not change continuously or abruptly in the direction of flow of the product.

The solid metal blocks consist of metals or metal alloys, preferably having heat conductivities of more than 100 Kcal/m.hour.degree, and especially of aluminum or aluminum alloys. The cavity-like passages in the metal block for receiving the primary heat carrier can be plain bores or can be pipes or pipe coils round which the metal has been cast or pressed. Their construction will above all depend on the choice of the primary heat carrier.

Some specific embodiments of the heat exchange apparatus according to the invention are described below with reference to the accompanying drawings in which FIG. 1 is an exploded schematic view of a heat exchanger according to an embodiment of the invention with solid, plate-shaped blocks;

FIG. 4 is a cross-sectional view of a heat exchanger according to an embodiment of the invention which shows cavity-like passages at right angles to continuous bores; and FIGS. 5a, 5b and 5c show in plan view alternate configurations of metal rods having hollow profiles which may be inserted into the continuous bores depicted in FIG. 4.

Figure 1:
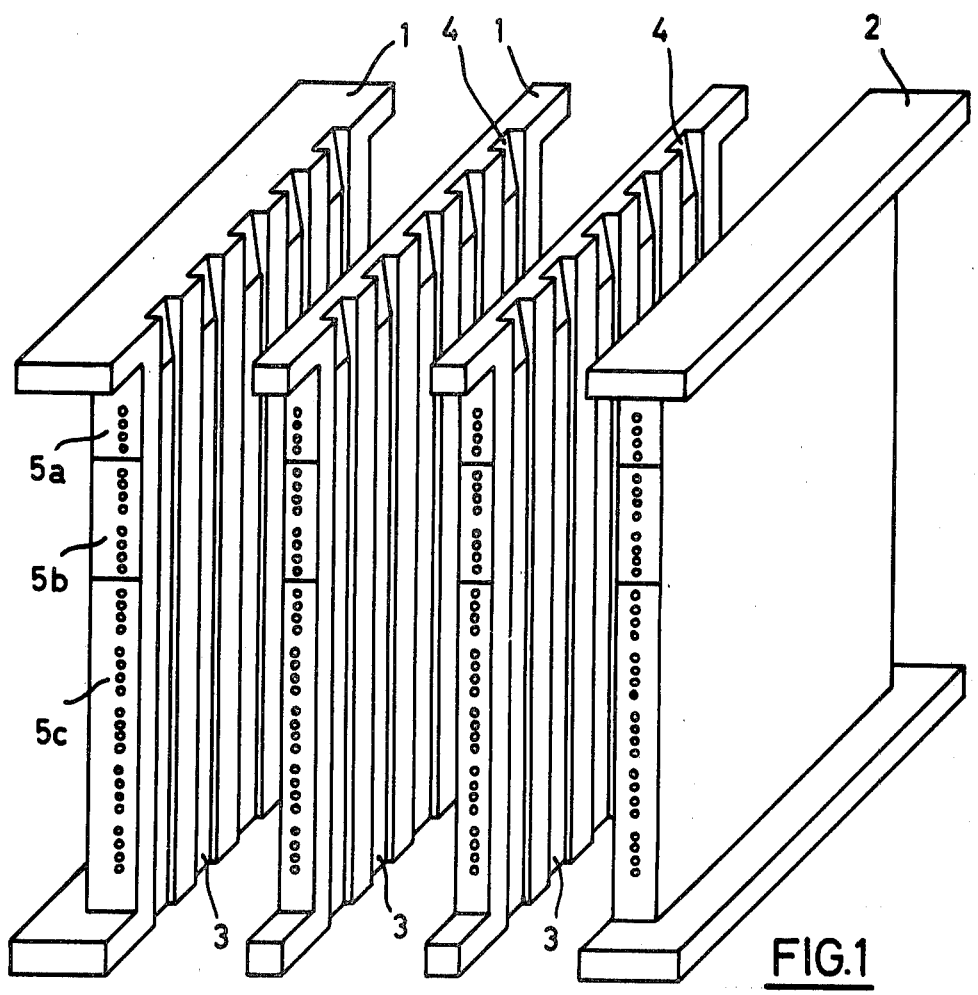

FIG. 1 schematically shows the construction of a heat exchanger according to the invention, in the dismantled condition, the solid metal blocks being plate-shaped. With the exception of the end block 2, the blocks 1 are provided on one side with a plurality of open flat slit-shaped channels 3. The channels 3 in a block 1 are parallel to one another and advantageously have a short inlet recess 4 in the feed side. This ensures the uniform distribution of the feed of thermoplastic material to all the channels 3. The inlet recess 4 preferably does not extend as far as the heated or cooled zone of the block 1. Furthermore, cavity-like passages 5 for receiving the primary heat carrier are provided in the blocks 1, 2, at right angles to the channels 3. The passages 5 preferably run parallel to one another and are sub-divided into three groups 5a, 5b and 5c which can be operated at different temperatures.

Figure 2A:
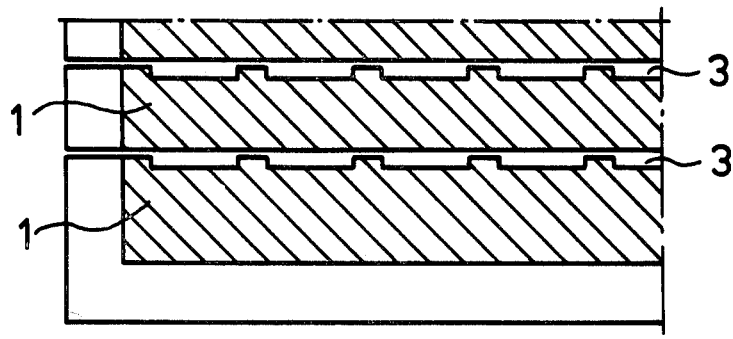
FIG. 2a is a cross-sectional top plan view of a portion of the heat exchanger of FIG. 1 showing the slit-shaped channels.
Figure 2B:
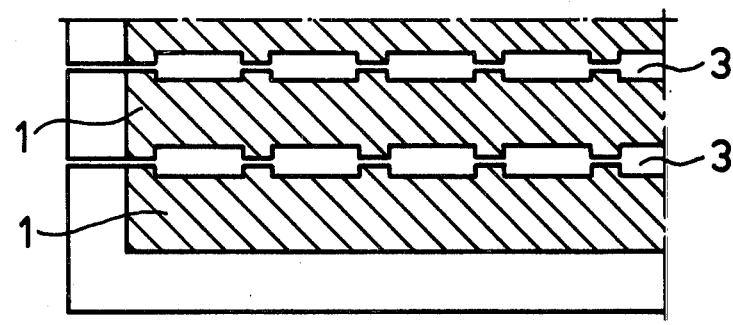
FIG. 2b is a cross-sectional top plan view of an alternate embodiment of FIG. 2a in which the central metal blocks have open slit-shaped channels on both sides and the depths of the slits are additive.

The individual blocks 1, 2 are assembled on the unit construction principle in the manner shown in side view in FIG. 1 and in plan view in FIG. 2 and are held together by appropriate means, such as tension bolts and screws, so that the open channels 3 of each block 1 form, with the flat back of the adjacent block 1, 2, sealed leakproof slit-shaped channels through which the product passes. The sealing faces between the blocks 1, 2 are advantageously treated by applying a softer substance. In this way, a heat exchanger built up of blocks is obtained which after operation can easily be dismantled into the individual blocks 1, 2, so that the channels 3 are exposed and can be cleaned and, where necessary, aftertreated, e.g. polished or passivated. Accordingly, in the case of a heat exchanger built up in the above manner from plate-shaped metal blocks, the blocks 1, 2 are identical with the previously mentioned segments of the heat exchanger, into which the heat exchanger can be dismantled to expose the channels through which the product passes.

The heat exchanger according to the invention, made up of plate-shaped metal blocks, which is shown schematically in FIG. 1, is very adaptable and can be constructed, or modified, in diverse ways. It is a particular advantage of the apparatus that it is easily adapted, by minor variations, to specific process conditions.

Figure 2C:
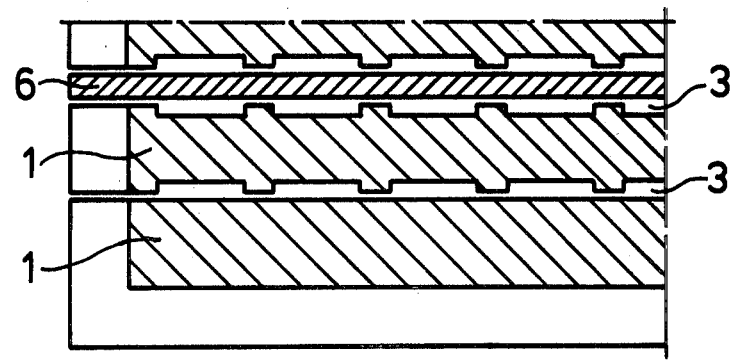
FIG. 2c is a cross-sectional top plan view of an alternate embodiment of FIG. 2a in which the central metal blocks have open slit-shaped channels on both sides and in which plane-parallel plates are placed between the blocks having channels on both sides.

It is of course possible to provide the central plate-shaped metal blocks 1 on both sides with open slit-shaped channels 3. In that case, the terminal block 2 can also possess slit-shaped channels 3 on its inner face. The blocks 1, which possess channels 3, on both sides, can be assembled so that the depths of the slits are additive, as is shown in plan view in FIG. 2b. This may be advantageous, for example, if relatively long residence times of the product in the heat exchanger are required. It is also possible, as shown in FIG. 2c, to provide plane-parallel plates 6 between the blocks 1, which bear channels 3 on both sides, when assembling the said blocks. These plates 6 can have been manufactured from the same material as the blocks 1 or from a different material, and may, for example, serve as special gaskets between the individual segments. In addition, it may be advantageous if the inserted plates 6 permit carrying out an additional treatment of the product, e.g. if they serve as a source of ultrasonics or radiation, and/or if they contain measuring elements, e.g. transmitters for measuring the pressure and temperature of the stream of product.

Figure 3:
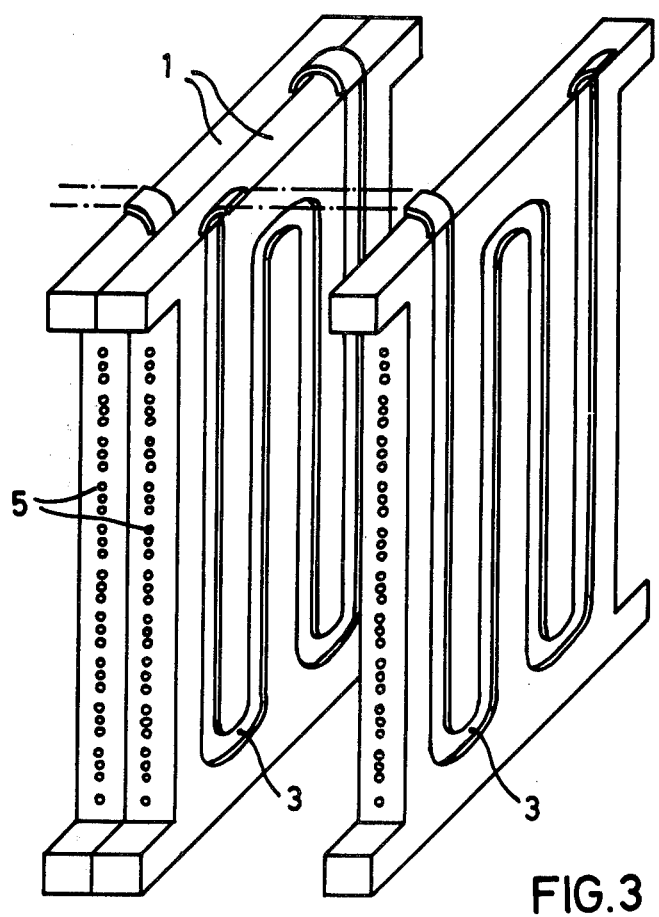
FIG. 3 is an exploded schematic view similar to FIG. 1 of an arrangement of channels wherein the ends of the channels are joined so that only one stream of product flows through the heat exchanger.

In addition, further arrangements of the channels 3 are conceivable without departing from the inventive concept herein. One such arrangement is shown, by way of example, in FIG. 3. In this case, the channels 3 in the blocks 1 are joined so that only one stream of product flows through the entire heat exchanger. Given this connection of the channels 3, each individual block 1, 2 can be separately heated or cooled. Further possible variations are in respect of the shape and width of the cross-section of the channels 3 in the case of the heat exchange apparatus of the invention built up from blocks 1, 2; these parameters can be varied substantially as desired. Thus, to suit the requirements of a particular process, the channels 3 may, beyond the inlet recess 4, remain of constant cross-section or widen or narrow once or several times, gradually or abruptly. This makes it possible to alter the residence time of the product and the pressure in the heat exchanger. In particular, it makes it possible to select different conditions for the individual heating or cooling zones. The channels 3 may be angular or rounded and may, as has already been mentioned, be lined with thin-walled hollow profiles, which may be open or closed, but must not present a barrier to heat flow.

FIG. 4 shows, in cross-section, another possible embodiment of the heat exchanger of the invention. Horizontal, mutually parallel cavity-like passages 5 for receiving the primary heat carrier are set into the individual metal blocks. The passages 5 in the individual blocks 7 can be grouped together to form separate zones, so that the individual blocks 7 can be set to different temperature conditions. At right angles to the passages 5, and running vertically, the blocks 7 have continuous bores 8. These mutually parallel bores 8 are arranged in the same manner in each individual block 7 so that on superposing the blocks 7, as is the case when assembling the heat exchanger, the vertical bores 8 of the individual block 7 are precisely above one another and as a result the bores 8 of the assembled heat exchanger pervade the entire length of the latter. In the assembled condition, the blocks 7 are held together by suitable means, such as tension bolts or tension screws. When assembling the individual blocks 7, it may be useful to provide thin interlayers of heat-insulating materials so as to ensure better heat insulation between the blocks 7 which can be set to different temperature conditions.

Metal rods 9 which contain a hollow profile and do not constitute a barrier to heat flow are provided in the bores 8 of the assembled blocks 7. Since the solution or melt to be heated or cooled passes through the profiles 10 of the rods 9, the said profiles are in the form of slit-shaped channels. One rod 9 may contain one or more of the slit-shaped hollow profile channels 10, the shape of which is substantially optional, though the depth of the slits is preferably from 0.5 to 4 mm. FIG. 5 shows, in plan view, possible embodiments of the rods 9 which contain hollow profiles. In order to clean the channels through which the product passes, the rods 9 containing the hollow profiles can easily be forced out of the bores 8 of the blocks 7 and replaced by new rods. In this case therefore the previously mentioned segments, into which the heat exchanger can, according to the invention, be dismantled, are the rods 9, containing hollow profiles, on the one hand, and the blocks 7, on the other.

Since the rods 9 which contain hollow profiles are replaced when soiled and are thus disposable components, they are as a rule manufactured from a very cheap metal, e.g. from aluminum alloy. Preferably, soft, readily deformable materials are employed, which can easily be forced into the bores 8 of the blocks 7 in such a way as not to constitute a barrier to heat flow. The rods 9 may themselves be manufactured by conventional processes, e.g. by extrusion.

The process of the invention, and the apparatus of the invention, have many advantages over conventional conditioning processes and heat exchange apparatuses for highly viscous solutions or melts of thermoplastics. Thus, the solution or melt of the thermoplastic can be heated or cooled rapidly and uniformly under gentle and controlled conditions, and accordingly the solution or melt can be brought, without excessive heat exposure or damage to the product, to the appropriate conditions for the further treatment and after-treatment of the products in conventional apparatuses or on conventional machinery. Furthermore, because of their flexibility and variability, the process and apparatus of the invention permit optimum adaptation to the downstream conventional equipment used for the further treatment or aftertreatment of the products.

Examples of the above are the conditioning of plastic melts before they reach shaping tools, e.g. slot dies for the manufacture of sheets and films, or before they reach face-cutting devices for granulating the product. A further example is the conditioning of heat-sensitive plastics in solution, e.g. of polymers which contain vinyl halides, acrylonitrile and butadiene. With these, it is particularly advantageous to employ very small temperature differences, particularly if the solution is to be heated to near its boiling point and is to be fed into a reactor or devolatilizing extruder. If thick layers of such products are heated in conventional heat exchangers, boiling at the wall surface may occur since large temperature differences have to be employed, and such boiling may damage the solid present in the solution, by causing, e.g., cracking, yellowing or crosslinking.

The Examples which follow illustrate the invention.

EXAMPLE 1

After working up a polystyrene melt as obtained by the mass polymerization of styrene, 2,000 kg per hour of polystyrene melt at from 230 to 250° C. are obtained, and are forced, by means of a gear pump, through a heat exchanger of the invention, heated to a temperature of 300° C. and fed, at this temperature, to a face cutter which converts the polystyrene to lentil-shaped pellets, which constitute a saleable form.

A heat exchanger according to FIG. 1, composed of 25 plate-shaped stainless steel elements, is employed for the above purpose. The heat exchanger comprises a total of 600 slit-shaped channels of size 2.5 cm×0.4 cm×150 cm. The cavity-like passages for the primary heat carrier are subdivided into three groups which, in the direction of product flow, are successively at temperatures of 260° C., 290° C. and 310°–320° C. The temperature in the last heat-conditioning zone is regulated so as to keep the melt output temperature constant at 300° C. The primary heat carrier is a commercial heat transfer fluid. The heat exchanger is provided at the top and bottom with a distributor cone to act as a product inlet and outlet respectively.

Since the face cutter is sensitive to fluctuations in temperature of the polystyrene melt, the heating of the polystyrene melt must on the one hand be well controlled but on the other hand be effected gently and rapidly, since lengthy residence times cause yellowing and degradation of the polymer. In the present Example, very uniform polystyrene granules which are very light in color are obtained. If a conventional tubular heat exchange with internal tube diameters of 10 mm is employed, temperature fluctuations produce a proportion of faulty granules and, in most cases, a slightly yellowish polymer, so that the product color fluctuates in an undesirable manner.

EXAMPLE 2

In this Example, a heat exchange apparatus according to the invention, of the type shown in FIG. 4, is employed. Here, the heat exchanger consists of four solid metal blocks 7 made from an aluminum alloy. In the direction of product flow, the first block is 10 cm high and the three remaining blocks each 30 cm high. A heat insulating layer consisting of an asbestos sheet is provided between successive blocks 7. The heat exchanger has 400 bores 8 of 2.5 cm diameter, into which are forced 400 metal rods 9 of 100 cm length, containing a hollow profile, without creating a heat barrier between the rods and the blocks. The slit-shaped hollow profile channel 10 of each rod 9 is of size 0.2 cm × 2 cm. Several layers of heating needles made from steel tube are embedded by casting in the blocks 7, to act as cavity-like passages 5 for the primary heat carrier. The entire heat exchanger is operated in cross-current in four temperature zones. These zones are set, successively in the product flow direction, to 150° C., 170° C., 190° C. and 210° C. At the top and bottom the heat exchanger is provided with a distributor cone to act as a product inlet and outlet respectively. The heat exchanger is employed to preheat a styrene-acrylonitrile copolymer solution which is then fed to a devolatilizing extruder to remove the volatile constituents.

About 600 kg per hour of a solution, of about 65% strength, of a styrene-acrylonitrile copolymer in its monomers and inert solvents, the solution being at 150° C., are forced by means of a pump from the polymerization zone through the heat exchanger. The solution leaves the heat exchanger at a temperature of 200° C., the pressure being above the saturation pressure of the volatile solution constituents at this temperature. The preheated solution is expanded through a nozzle into a conventional twin screw devolatilizing extruder of 4.5 inch shaft diameter, in which extruder the material is separated into volatile constituents and plastic melt, under the conventional conditions. Per hour, about 400 kg of polymer having a pale yellowish intrinsic color are obtained. The polymer exhibits only very little contamination and does not contain any coke-like black particles of diameter greater than 0.01 mm.

If, in this process, a conventional tube bundle heat exchanger with 16 mm internal tube diameter, and heated with steam at 205° C., is employed instead of the heat exchange apparatus of the invention, a polymer which is significantly yellower in color and has a higher content of contaminant, substantial proportions of coke-like black particles of 0.1 mm diameter being present, is obtained.

We claim:

1. An apparatus for the controlled temperature conditioning of a viscous solution or melt of a thermoplastic material, said apparatus comprising:
    at least two solid metal segments each having correspondingly formed side surfaces designed to abut each other in a leak-tight manner when in an assembled form so as to allow heat to flow therebetween;
    a series of generally parallel slip-shaped channels formed at a substantially uniform depth in at least one of said abutting side surfaces for receiving and guiding said thermoplastic material from a charging end of said assembled segments to a discharging end thereof; and
    said segments being subdivided into a plurality of zones extending generally across said channels, said segment zones having cavity-like passages formed therein for receiving a heat carrier medium, whereby said zones can be operated at different temperatures for the controlled temperature conditioning of said thermoplastic material as it passes through said channels.

2. An apparatus as set forth in claim 1 wherein said channels are formed with a widened cross-sectional depth at the charging end of said segments.

3. An apparatus as set forth in claim 1 wherein the width of said channels is uniform throughout said segments.

4. An apparatus as set forth in claim 1 wherein the width of said channels varies throughout said segments.

* * * * *